United States Patent
Lenz, Jr. et al.

(10) Patent No.: US 11,580,117 B2
(45) Date of Patent: *Feb. 14, 2023

(54) MACHINE LEARNING SYSTEM AND METHOD TO MAP KEYWORDS AND RECORDS INTO AN EMBEDDING SPACE

(71) Applicant: Dstillery, Inc., New York, NY (US)

(72) Inventors: Peter Ernest Lenz, Jr., Valhalla, NY (US); Yeming Shi, San Francisco, CA (US); Amelia Grieve White, Old Greenwich, CT (US); Patrick Joseph McCarthy, New York, NY (US); Melinda Han Williams, Brooklyn, NY (US)

(73) Assignee: Dstillery, Inc., New York, NY (US)

( * ) Notice: Subject to any disclaimer, the term of this patent is extended or adjusted under 35 U.S.C. 154(b) by 188 days.

This patent is subject to a terminal disclaimer.

(21) Appl. No.: 17/157,473

(22) Filed: Jan. 25, 2021

(65) Prior Publication Data
US 2021/0319035 A1 Oct. 14, 2021

Related U.S. Application Data

(63) Continuation of application No. 16/937,223, filed on Jul. 23, 2020, now Pat. No. 10,902,009.
(Continued)

(51) Int. Cl.
*G06F 16/00* (2019.01)
*G06F 16/2457* (2019.01)
(Continued)

(52) U.S. Cl.
CPC .... *G06F 16/24578* (2019.01); *G06F 16/2282* (2019.01); *G06F 16/243* (2019.01); *G06F 16/2438* (2019.01); *G06F 40/274* (2020.01)

(58) Field of Classification Search
CPC .............. G06F 16/2282; G06F 16/243; G06F 16/2438; G06F 16/24578
See application file for complete search history.

(56) References Cited

U.S. PATENT DOCUMENTS

| 8,655,695 | B1 | 2/2014 | Qu et al. |
| 10,417,653 | B2 | 9/2019 | Milton et al. |

(Continued)

OTHER PUBLICATIONS

Li et al, "Crowdsourced Data Management: A Survey," IEEE Transactions On Knowledge And Data Engineering, vol. 28, No. 9, Sep. 2016, pp. 2296-2319 (Year: 2016).*
(Continued)

*Primary Examiner* — Cheryl Lewis
(74) *Attorney, Agent, or Firm* — Cooley LLP

(57) ABSTRACT

In some embodiments, a method includes determining a position for a search query and a position for each audience record from multiple audience records in an embedding space. The method further includes receiving multiple device records, each associated with an audience record. The method further includes determining multiple keywords, each associated with an audience record and determining a position for each keyword in the embedding space. The method further includes calculating a first distance between the position of the search query in the embedding space and the position of each audience record in the embedding space. The method further includes calculating a second distance between the position of the search query in the embedding space and the position of each keyword in the embedding space. The method further includes ranking each audience record based on the first distance and the second distance.

20 Claims, 5 Drawing Sheets

Related U.S. Application Data

(60) Provisional application No. 62/947,904, filed on Dec. 13, 2019, provisional application No. 62/877,715, filed on Jul. 23, 2019.

(51) Int. Cl.
*G06F 16/242* (2019.01)
*G06F 40/274* (2020.01)
*G06F 16/22* (2019.01)

(56) References Cited

U.S. PATENT DOCUMENTS

| | | | |
|---|---|---|---|
| 10,878,480 | B2 | 12/2020 | Hueter et al. |
| 10,902,009 | B1* | 1/2021 | Lenz, Jr. ............... G06F 16/243 |
| 11,068,935 | B1 | 7/2021 | White et al. |
| 2010/0138437 | A1 | 6/2010 | Nadig et al. |
| 2010/0198772 | A1 | 8/2010 | Silverman |
| 2011/0258049 | A1 | 10/2011 | Ramer et al. |
| 2012/0084349 | A1 | 4/2012 | Lee et al. |
| 2014/0297394 | A1 | 10/2014 | Li et al. |
| 2015/0081734 | A1 | 3/2015 | Mason |
| 2017/0236167 | A1 | 8/2017 | Bindra et al. |
| 2017/0300966 | A1 | 10/2017 | Dereszynski et al. |
| 2018/0246873 | A1 | 8/2018 | Latapie et al. |
| 2018/0314704 | A1 | 11/2018 | Bull et al. |
| 2018/0357531 | A1 | 12/2018 | Giridhari et al. |
| 2019/0124381 | A1 | 4/2019 | Sheppard et al. |
| 2019/0296844 | A1 | 9/2019 | Corder et al. |
| 2019/0332617 | A1 | 10/2019 | Weston et al. |
| 2020/0104738 | A1 | 4/2020 | Williams et al. |
| 2020/0195779 | A1 | 6/2020 | Weisman et al. |
| 2022/0012614 | A1 | 1/2022 | White et al. |
| 2022/0129777 | A1 | 4/2022 | White et al. |
| 2022/0261674 | A1 | 8/2022 | White et al. |

OTHER PUBLICATIONS

Robertson et al., "Auditing Partisan Audience Bias within Google Search," Proceedings of the ACM on Human-Computer Interaction, vol. 2, Issue CSCW, Nov. 2018, Article No. 148, pp. 1-22. (Year: 2018).*

Final Rejection for U.S. Appl. No. 17/569,412, dated Sep. 9, 2022, 48 pages.

Koza.J.R., et al., "Automated Design of Both the Topology and Sizing of Analog Electrical Circuits Using Genetic Programming," Artificial Intelligence in Design '96, pp. 151-170, 1996.

Non-Final Office Action for U.S. Appl. No. 17/569,412, dated May 24, 2022, 44 pages.

Non-final Rejection for U.S. Appl. No. 16/586,502 dated Apr. 1, 2022, 8 pages.

Non-Final Office Action for U.S. Appl. No. 17/732,249 dated Jul. 7, 2022, 46 pages.

Non-Final Office Action dated Feb. 17, 2021, for U.S. Appl. No. 17/108,770, 36 pages.

Notice of Allowance dated Jun. 10, 2021, for U.S. Appl. No. 17/108,770, 16 pages.

Notice of Allowance dated Sep. 17, 2020, for U.S. Appl. No. 16/937,223, 11 pages.

Wikipedia (2022). "Machine Learning," retrieved on Jul. 13, 2022, located at https://en.wikipedia.org/wiki/Machine_learning, 30 total pages.

Raeder, T. et al. (2013). "Scalable Supervised Dimensionality Reduction Using Clustering," Proceedings of the 19th ACM SIGKDD International Conference on Knowledge Discovery and Data Mining, pp. 1213-1221.

* cited by examiner

MACHINE LEARNING SYSTEM AND METHOD TO MAP KEYWORDS AND RECORDS INTO AN EMBEDDING SPACE

CROSS REFERENCE TO RELATED APPLICATIONS

This application is a continuation of U.S. patent application Ser. No. 16/937,223, filed Jul. 23, 2020, now U.S. Pat. No. 10,902,009 which claims priority to U.S. Provisional Application No. 62/877,715, filed Jul. 23, 2019 and U.S. Provisional Application No. 62/947,904, filed Dec. 13, 2019, the entire disclosure of each of which is hereby incorporated by reference.

TECHNICAL FIELD

The present disclosure relates to machine learning techniques that enable improvements in identifying target audience devices, in response to a search query. Such machine learning techniques can include applying natural language processing techniques, such as translating keywords representing observed behavioral data into a word embedding and ascertaining a similarity between the representations of observed behavioral data and the search query.

BACKGROUND

To more effectively target content, techniques have been developed to predefine website visitors (also referred to herein as "users") as members of one or more "audiences" based, for example, on their browsing history, demographic data, and/or other relevant information. Content can be selected for delivery to a predefined audience such that, when a member of the audience is observed accessing a webpage, an advertisement associated with that audience can be delivered.

When a targeted content (e.g., advertising) campaign is initiated, therefore, selecting an appropriate audience will significantly impact what users are ultimately exposed to the content. According to known techniques, the precise composition of the audience is often proprietary and not available to the advertiser. Advertisers, therefore, may rely on a descriptive name or summary statistics to select an appropriate audience. Existing tools for selecting a (pre-defined) audience suffer from a number of drawbacks. For example, relying on the descriptive name of an audience, at best, provides coarse-grained information about the audience. In some situations, however, this descriptive title may provide insufficient information. For example, an audience identified as "shoppers" provides little guidance as to the interests of the audience members. In other situations, the descriptive title may be misleading. For example, an advertising network could identify an audience as "Luxury Retail Shoppers," which would typically be expected to command a premium value, when audience has little or no demonstrated interest in luxury products. In other situations, the descriptive name can be ineffective. For example, if a set of cookies associated with luxury retail purchase history were labeled as "shoppers". In yet other situations, advertisers may want to explore a potential audience based on the potential audience's other interests. For example, an advertiser may want to target outdoor enthusiasts, but the advertiser may not have thought to target hiking enthusiasts or fishing enthusiasts specifically in the descriptive title.

Thus, a need exist for improved methods, apparatus, and non-transitory processor-readable medium to overcome the deficiencies of known audience search methods. Presented here include some embodiments of audience explorer method that uses an embedding space in conjunction with a method to explore audiences based on audiences and a set of keywords associated with each audience.

SUMMARY

In some embodiments, a method includes determining a position for a search query and a position for each audience record from multiple audience records in an embedding space. The method further includes receiving multiple device records, each associated with an audience record. The method further includes determining multiple keywords, each associated with an audience record, and determining a position for each keyword in the embedding space. The method further includes calculating a first distance between the position of the search query in the embedding space and the position of each audience record in the embedding space. The method further includes calculating a second distance between the position of the search query in the embedding space and the position of each keyword in the embedding space. The method further includes ranking each audience record based on the first distance and the second distance.

DETAILED DESCRIPTION

In an embodiment, a method includes receiving and/or generating an embedding space (e.g., a word embedding) for a large dictionary of words. The method further include receiving a search query. The method further includes receiving a set of audience records and a set of device records associated with the set of audience records. A search query embedding can be generated such that the search query assumes a position in the embedding space. For each audience record from the set of audience records, an audience embedding can be generated such that a descriptive title of each audience record assumes a position in the embedding space. A set of keywords associated with browsing history of each audience record from the set of audience records can also be determined based, for example, on behavioral data associated with at least a subset of device records that are associated with that audience record. In some instances, the behavioral data can be aggregated for an audience record such that behavioral data associated with individual audience members is not available for analysis. A keyword embedding can be generated such that one or more keywords associated with each audience record assumes a position in the embedding space. A distance in the embedding space between the search query and audience embeddings and/or keyword embeddings can be determined. Each audience record can be scored and/or a ranked list of audience records can be generated, based on the relative distance of each audience record (e.g., audience embeddings and/or keyword embeddings associated with each audience record) from the search query in the embedding space.

Figure 1:
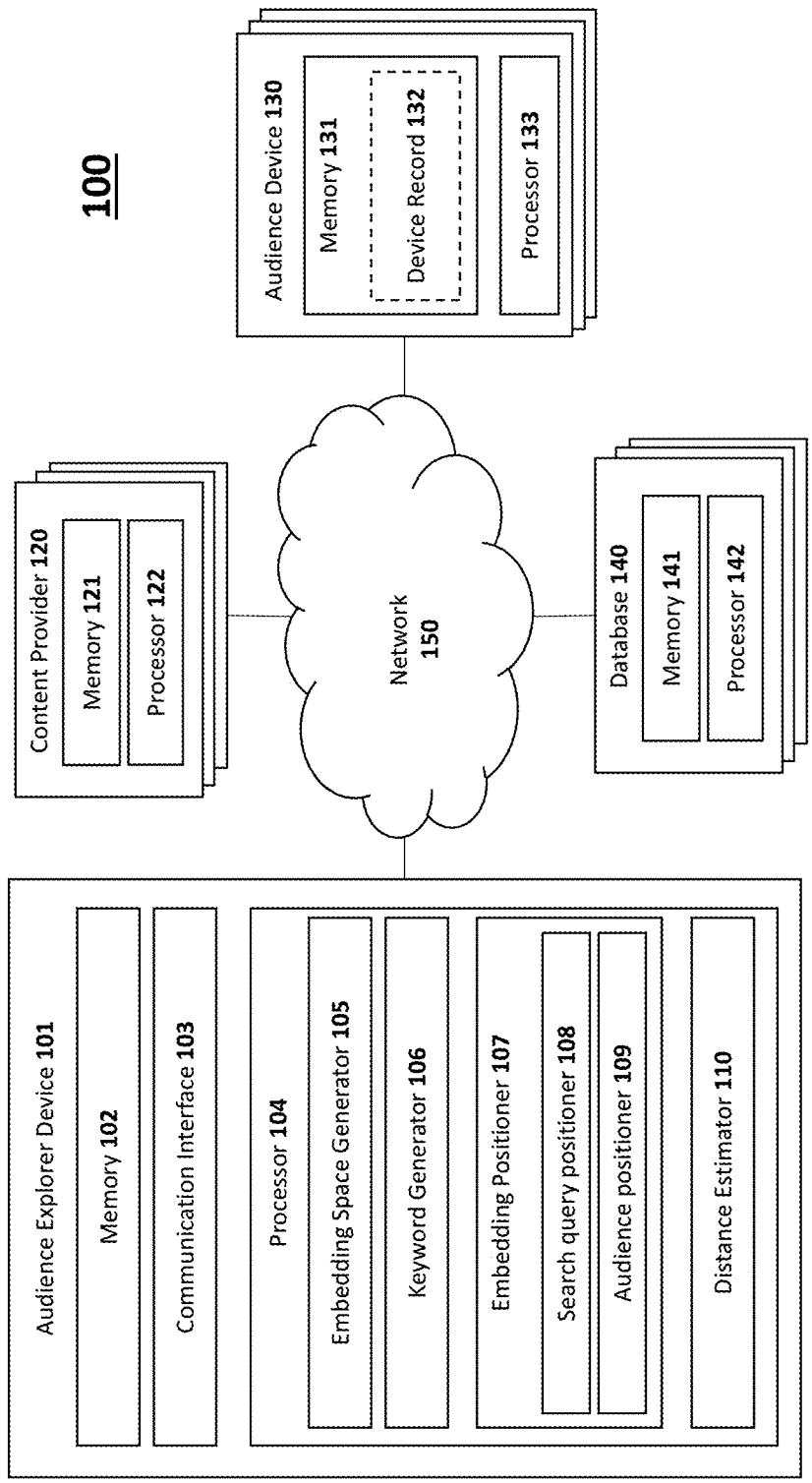
FIG. 1 is a schematic block diagram of an audience explorer system, according to an embodiment.

FIG. 1 is a schematic block diagram of an audience explorer system 100, according to an embodiment. The audience explore system 100 includes an audience explorer device 101 (e.g., a compute device) connected to a network 150. One or more content provider(s) 120, audience device(s)s 130, and database(s) 140 can also be connected to the network 150. The audience explorer device 101 can be operable to generate a ranked list of audience records based on a set of audience records received from a data source (e.g., the set of content providers 120, the set of audience devices 130, the set of databases 140, and/or the like) and an audience search query, according to an embodiment. As discussed in further detail herein, the content providers 120 can be compute devices associated with an advertiser, an advertising network, a syndicated content delivery service, and/or other suitable content provider. The content providers 120 are generally configured to select appropriate content for delivery to the set of audience devices 130. The content providers 120 can be communicatively coupled to the audience explorer device 101, which can be operable to define audiences (groups of audience devices 130) and enable the content providers 120 to select an appropriate audience to which content can be delivered.

The database(s) 140 are databases, such external hard drives, database cloud services, external compute devices, virtual machine images on a stored device(s), and/or the like. Each database 140 can include one or more memor(ies) 141 and/or processor(s) 142. The processor 142 can be, for example, a hardware based integrated circuit (IC) or any other suitable processing device configured to run and/or execute a set of instructions or code. For example, the processor 142 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 142 is operatively coupled to the memory 141 through a system bus (not shown; for example, address bus, data bus and/or control bus). The memory 141 can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth. The set of databases can communicate with the audience explorer device 101 via a network 150.

The set of content providers 120 are compute devices, such as mainframe compute devices, servers, social media services, personal computers, laptops, smartphones, or so forth, each having a memory 121 and a processor 122. The processor 122 can be, for example, a hardware based integrated circuit (IC) or any other suitable processing device configured to run and/or execute a set of instructions or code. For example, the processor 122 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 122 is operatively coupled to the memory 121 through a system bus (not shown; for example, address bus, data bus and/or control bus). The memory 121 can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth. The set of content providers 120 can communicate with the audience explorer device 101 via a network 150.

The set of audience devices 130 are compute devices, such as personal computers, laptops, smartphones, or so forth, each having a memory 131 and a processor 133. The processor 133 can be, for example, a hardware based integrated circuit (IC) or any other suitable processing device configured to run and/or execute a set of instructions or code. For example, the processor 133 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 133 is operatively coupled to the memory 131 through a system bus (not shown; for example, address bus, data bus and/or control bus). The memory 131 can be, for example, random access memory (RAM), memory buffers, hard drives, databases, erasable programmable read only memory (EPROMs), electrically erasable programmable read only memory (EEPROMs), read only memory (ROM), flash memory, hard disks, floppy disks, cloud storage, and/or so forth. The memory 131 of each audience device can be configured to optionally include a device record 132 such as for example a browsing history, a cookie record, and/or the like. The set of audience devices 120 can communicate with the audience explorer device 101 via a network 150.

The audience explorer device 101, also referred to herein as "the audience explorer" or "the device," can include a hardware-based computing device and/or a multimedia device. For example, in some instances, the audience explorer device 101 can include a compute device, a server, a desktop compute device, a smartphone, a tablet, a wearable device, a laptop and/or the like. The audience explorer device 101 includes a memory 102, a communication interface 103, and a processor 104.

The memory 102 of the audience explorer device 101 can be, for example, a random access memory (RAM), a memory buffer, a hard drive, a read-only memory (ROM), an erasable programmable read-only memory (EPROM), and/or the like. The memory 102 can store, for example, one or more software modules and/or code that can include instructions to cause the processor 104 to perform one or more processes, functions, and/or the like (e.g., the embedding space generator 105, the keyword generator 106, the embedding positioner 107, the search query positioner 108, the audience positioner 109, and the distance estimator 110). In some implementations, the memory 102 can be a portable memory (e.g., a flash drive, a portable hard disk, and/or the like) that can be operatively coupled to the processor 104. In other instances, the memory can be remotely operatively coupled with the audience explorer device 101. For example, a remote database 140 server can be operatively coupled to the audience explorer device 101 via network 150.

The memory 102 can store the data including, but not limited to, the embedding space, the set of audiences, the audience search query, the data generated by operating the processor 104 to run the audience explorer device 101 (i.e., temporary variables and/or return addresses), and/or the like. The memory 102 can also include data to generate the embedding space.

The communication interface 103 can be a hardware device operatively coupled to the processor 104 and memory 102 and/or software stored in the memory 102 and executable by the processor 104. The communication interface 103 can be, for example, a network interface card, a Wi-Fi™ module, a Bluetooth® module, an optical communication module, and/or any other suitable wired and/or wireless communication device. Furthermore, the communication interface 103 can include a switch, a router, a hub and/or any other network device. The communication interface 103 can be configured to connect the audience explorer device 101 to a network 150. In some instances, the communication interface 103 can be configured to connect to a communication network such as, for example, the internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

The processor 104 can be, for example, a hardware based integrated circuit (IC) or any other suitable processing device configured to run and/or execute a set of instructions or code. For example, the processor 104 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 104 is operatively coupled to the memory 102 through a system bus (for example, address bus, data bus and/or control bus).

The processor can include an embedding space generator 105, a keyword generator 106, an embedding positioner 107, and a distance estimator 110. Each of the embedding space generator 105, the keyword generator 106, the embedding positioner 107, and the distance estimator 110, can include software stored in the memory 102 and/or executed by the processor 104 (e.g., code to cause the processor 104 to execute the embedding positioner 109 and/or the distance estimator 110 can be stored in the memory 102). Each of the embedding space generator 105, the keyword generator 106, the embedding positioner 107, and the distance estimator 110 can include a hardware based device such as, for example, an ASIC, an FPGA, a CPLD, a PLA, a PLC, and/or the like. For example, the keyword generator 106 can be implemented in a hardware based device that determined keywords associated with audience records. The memory 102 can be configured to generate, receive and/or store data including an embedding space, a set of audience records, and an audience search query. The processor 104 can be configured to generate a ranked list of at least a portion of the set of audience records based on the audience search query, the set of audiences, and the embedding space.

The embedding space generator 105 can receive and/or generate an embedding space. The embedding space can be generated based on an English (or other) language corpus, such as fiction and/or non-fiction books, reference works, such as Wikipedia, and/or any other suitable database. U.S. Patent Application Nos. 62/737,620 and Ser. No. 16/586,502, the entire disclosure of each which is hereby incorporated by reference in its entirety, include a description of a technique to generating the embedding space. The embedding space generator 105 can be configured to generate the embedding space using any generally available vector representation library, such as fastText, ELMo, BERT, Word2Vec, GloVe, and/or the like. The embedding space can be a word embedding in which words or phrases from the corpus are mapped to vectors of real number using a set of Natural Language Processing language modeling and feature learning techniques. The embedding space can be a representation of homogeneous data or heterogeneous data. Homogenous data refers to a collection of similar information, for example, a list of names of residents of a town. Heterogeneous data refers a collection of dissimilar information. Homogenous and/or heterogeneous data can be structured or unstructured data. Structured data has a predefined standardized format for providing information, for example, a list of homes, homeowners, addresses, market values, and/or the like stored in a database file and/or in a comma-separated value (CSV) file. Unstructured data can include information that have some organizational properties but are not stored in a standardized format, for example data found in an extendible markup language (XML) or javascript object notation (JSON) file. In some embodiments, the audience explorer device 101 can receive the embedding space from a third party device. For example, the audience explorer device 101 can receive the embedding space from a database 140.

The keyword generator 106 can associate browsing history or other suitable behavioral data with audience records. Each audience record from the set of audience records can be associated with one or more audience devices 130. Typically an audience (represented by an audience record) will be associated with multiple audience devices 130. Each audience device 130 can be associated with a device record which can include, for example, browsing history information, a cookie record, and/or the like. In some instances, audience records and/or data associated with audience records can be received in an aggregated format. Similarly stated, in some embodiments, behavioral data for individual audience members/audience device(s) 130 is obscured or otherwise not available for analysis and/or processing. The websites (e.g., a list of 10 websites, a list of 50 websites, a list of 100 websites, a list of 500 websites, a list of 1000 websites, and/or the like) most frequently visited by audience devices and/or an aggregate of audience devices in an audience can be identified. A set of keywords can be associated with each website indicated in the list of most frequently visited websites and/or in the browsing history of each audience device 130. The set of keywords can, for example, be obtained (e.g., scraped) from the websites and can include text from the website, a website metadata, data associated with an embedded file on the website, and/or the like. In particular, the website metadata can describe and give information about the contents of the website and/or interaction of audience device(s) 130 with the website. In other instances, the keyword generator 106 can be configured to find one or more keywords that are correlated to each audience record from the set of audience records. The correlation between an audience record with keyword(s) can be expressed using an index of correlation that represents a quantitative measure of an audience's affinity for the keyword. For example, the set of audience devices 130 used by the audience have an index of correlation of 5 to the keyword "laser," meaning that members of the audience, compared to a random device, is 5 times more likely to go to the set of websites associated with the keyword "laser." In some instances, each keyword from the set of keywords can be associated with content of a website disproportionately visited as indicated by the device record (e.g., a browsing history, a cookie record, and/or the like) that are associated with an audience. In some instances, each keyword is obtained by identifying a word statistically overrepresented on a website disproportionately visited as indicated by the device records that are associated with the audience.

The embedding positioner 107 can have a search query positioner 108 and/or an audience positioner 109, as described in further detail herein. The embedding positioner 107 can receive the embedding space, the set of audience records, and/or the set of keywords and define a position of each audience based on a descriptive title (or descriptor) of the audience (an "audience embedding") and/or keywords associated with the audience (a "keyword embedding) using fastText, ELMo, BERT, Word2Vec, GloVe, and/or the like. Similarly stated, the audience record assumes one or more positions (e.g., a set of coordinates representing the audience record) in the embedding space, such as a position associated with the descriptive title of the audience record and a position associated with keywords associated with the audience record. The embedding positioner 107 can further receive the audience search query and define a position of (e.g., a set of coordinates representing the search query) in the embedding space. Determining a position of, for example, the audience search query in the embedding space allows for a quantitative measure of the meaning of the audience search query to be defined. Similarly, the position of the descriptive title of the audience and/or set of keywords in the embedding space represents a quantitative measure of the meaning of descriptive title and/or the keywords, respectively. A distance between the audience search query and the descriptive title and/or the keywords thus represents a measure of the similarity between the meaning and/or context of the respective terms (e.g., semantic similarity), rather than a simple text match.

The search query positioner 108 can receive an audience search query using the communication interface 103 from, for example, the set of content providers 120, via the network 150. The embedding positioner 107 can be configured to generate an audience search query embedding from the search query. The search query positioner 108 can be configured to define a position for the audience search query embedding in the embedding space.

The audience positioner 109 can receive a set of audience records using the communication interface 103 from, for example, the set of databases 140, via the network 150. The embedding positioner 107 can generate an audience embedding from each audience record from the set of audience records. The audience positioner 109 can generate an audience embedding and/or a keyword embedding for each audience record from the set of audience records. The audience positioner 109 can define a position for the audience embedding and/or the keyword embedding in the embedding space.

The distance estimator 110 can calculate an audience distance between the position of a descriptive title and/or summary metric of the audience record in the embedding space (the audience embedding) and the position of the search query embedding in the embedding space. The distance estimator 110 can be configured further to calculate an audience keyword distance (e.g., a Euclidean distance, a Cosine distance, a word mover's distance (WDM), and/or the like) between the position of the audience keyword embedding in the embedding space and the position of the search query embedding in the embedding space. For example, in instances where multiple keywords are associated with one audience record, the distance estimation method can take an average of the distance between the search query embedding and the position of each keyword associated with that audience record in the embedding space, take a weighted average of a distance between the search query embedding and the position of each keyword associated with that audience record in the embedding space (e.g., such that more relevant keywords are weighted more heavily), taking a minimum, maximum, mode, mean, and so forth, of a set of distances for a set of keyword embedding associated with that audience record from the position of the audience embedding, and/or the like. The distance estimator 110 can iterate or operate in parallel to calculate distances between the position of the search query embedding in the embedding space and each audience record in the embedding space (e.g., taking into account the audience embedding and/or keyword embedding(s) associated with that audience record). The distance estimator 110 can further return a select list of audience records having the shortest overall distances from the search query embedding.

In use, the processor 104 allows a user to search and/or explore the set of audience records based on actual behavioral data derived from the set of audience devices. Similarly stated, the processor 104 can be configured to understand the contextual meaning of a search query by using a word embedding as a quantitative representation of the search query in the embedding space. This allows the processor 104 to search the data based on similarity of the representative concepts captured in the device behaviors and the keywords in the embedding space, rather than just the words as strings of letters. In some embodiments, the behavioral data associated with the set of audience devices is aggregated behavioral data and/or summary behavioral data such that behavioral data for individual members associated with each audience record from the set of audience records is not analyzed.

In some embodiments, the audience explorer device 101 receives, from a compute device, a search query and generates a search query embedding based on the search query. The audience explorer device 101 determines a position for the search query embedding in the embedding space (e.g., generated by the embedding space generator 105 or received from a third party). The audience explorer device 101 receives a set of audience records and, for each audience record, generates one or more keyword embeddings based on the behavioral data (optionally aggregated) associated with the audience record for that audience. The audience explorer device 101 then determines a position for each keyword embedding in the embedding space and calculates a similarity between the search query and each audience based on a distance between the search query embedding and the keyword embedding(s) associated with that audience. The audience explorer device can the send to the compute device, a ranked list of at least a subset of audiences from the set of audiences based on the similarity between the search query and the subset of audiences.

In some embodiments, the content providers 120 can explore a set of audience records based on the actual behavioral data of the set of audience devices 130 based on information received from the audience explorer device 101. The audience explorer device 101 can present information about the set of audiences and/or can allow an audiences to be selected by the content provider 120 via a webpage, an application programming interface (API), and/or any other suitable user interfaces operatively coupled to the audience explorer device 101. The content providers 120 can be configured further to store the selected audience (e.g., an identifier for the audience and/or users within the audience) in the memory 121. In some embodiments, the content provider 120 can be configured further to analyze the set of audiences locally using the processor 122 to generate a set of revised audiences. The content provider 120 can be configured further to facilitate the delivery of content (e.g., information, advertisement, media items, etc.) to the selected audience and/or the revised audience via any suitable means. In some instances, the content provider 120 can be operable to facilitate the placement of content through a real time bidding system implemented by the audience explorer device 101 or a distinct third-party service. Similarly stated, the content provider 120 can be operable to use audiences selected with the audience explorer device 101 to facilitate the delivery of content through any suitable portal.

Figure 2:
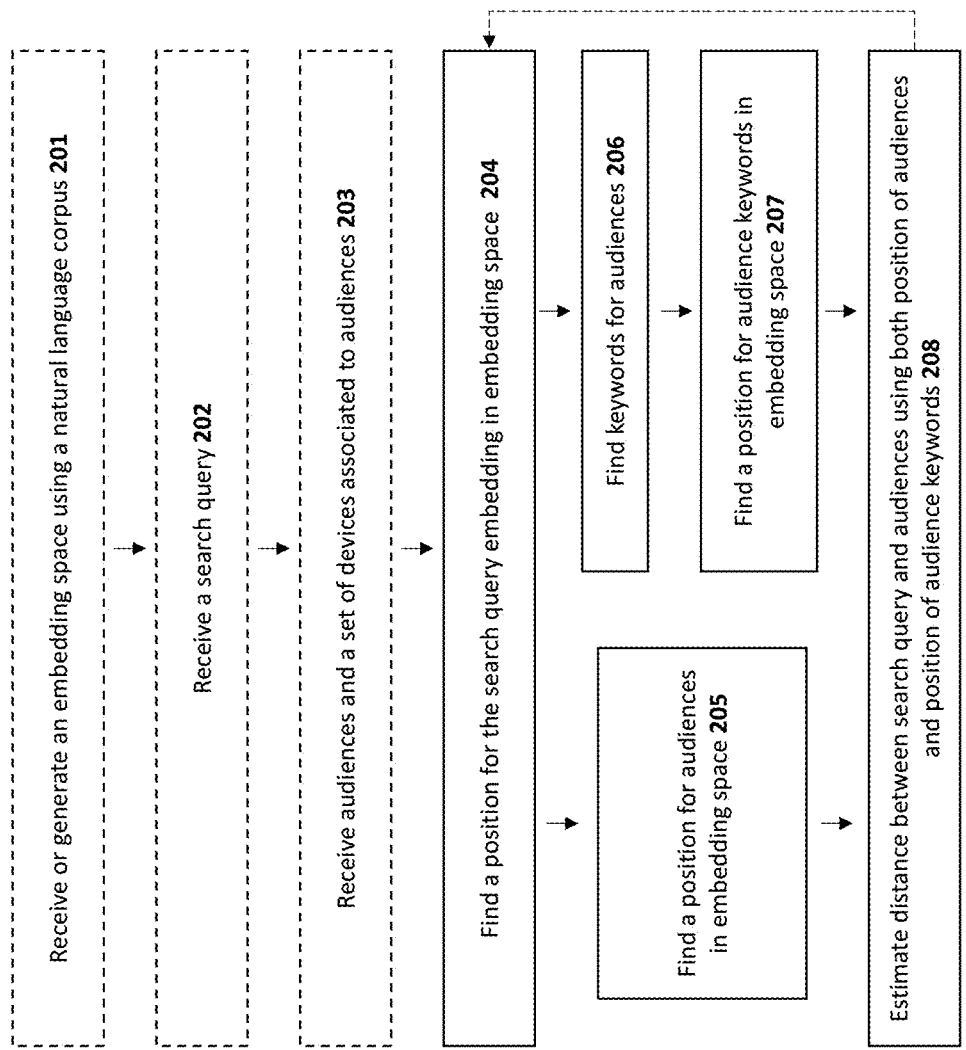
FIG. 2 is a method of exploring audiences based on a search query, according to an embodiment.

FIG. 2 is a flow chart of a method 200 of estimating a distances between a search query and a set of audiences, according to an embodiment. As shown in FIG. 2, the method 200 optionally includes receiving and/or generating an embedding space using a natural language corpus, at 201. The method 200 includes receiving, at 202, a search query. The method 200 includes receiving, at 203, a set of audiences and a set of devices associated with the audiences. At 204, the search query is given a search query position in the embedding space. At 205, the audiences are given audience positions in the embedding space. At 206, keywords are identified for each audience from the set of audiences. At 207, the keywords associated with at least one audience is given an audience keyword positions in the embedding space. The method 200 further includes estimating, at 208, a distance between search query and audience(s) using both the position of the audience(s) and the position of audience keywords.

At 201, an embedding space can be defined. The embedding space can be generated based on an English (or other) language corpus, such as fiction and/or non-fiction books, reference works, such as Wikipedia, and/or any other suitable database.

At 202, a search query is received. The search query can include a set of words or other suitable parameters. The search query can be entered via a web browser interface, an app in a mobile phone, and/or the like.

At 203, a set of audiences are received. Each audience from the set of audiences is associated with one or more audience devices. Each audience device can be associated with behavioral data, such as browsing history and/or one or more cookies. A set of keywords can be associated with each website indicated in the browsing history of each audience device. The keywords can, for example, be obtained (e.g., scraped) from the websites and can include text from the website, a website metadata, data associated with an embedded file on the website, and/or the like. In particular, website metadata can describe and give information about the contents of the website and/or the interaction of audience devices with the website.

In some instances, each audience from the set of audiences received at 203 can include aggregated behavioral data such that behavioral data from individual audience members/devices is not received. For example, a third party with access to behavioral data can pre-define audiences (i.e., groups of users/devices) and indications of such pre-defined audiences, and an aggregated behavioral data and/or summary of behavioral data for the audience can be received at 203.

At 204, a position for the search query is can be defined in the embedding space. An audience search query embedding is defined for the search query by finding a set of query word embedding and calculating an average of the set of query word embedding, a weighted average of the set of query word embedding, and/or the like.

An audience embedding can be defined for the audience based on the descriptive title or other summary characteristic of the audience. A position for the audience embedding in the embedding space can be defined, at 205.

At 206, one or more keywords for each audience from the set of audiences is determined. One or more audience devices (e.g., from the set of audience devices 130) can be associated with each audience from the set of audiences. Each audience device can be associated with a browsing history and/or one or more cookies. A set of keywords can be associated with each website indicated in the browsing history of each audience device. The key words can, for example, be obtained (e.g., scraped) from the websites and can include text from the website, a website metadata, data associated with an embedded file on the website, and/or the like. In particular, the website metadata can describe and give information about the contents of the website and/or the interaction of audience devices with the website. The set of keywords associated with each audience device can be associated with an audience that includes that audience device. In embodiments in which summary and/or aggregate behavioral data for audiences is received, the set of keywords associated with each audience can be similarly determined, but based on the aggregate data, for example, such that the behavioral data of no individual user/audience device is used to determine the keywords.

At 207, the position(s) of the keywords associated with an audience in the embedding space is determined. Similarly stated, a keyword embedding for each keyword can be defined. Each keyword can be associated with one or more audiences using an index of correlation that represents a quantitative measure of that audience's affinity for the keyword. For example, an index of correlation of 4 to the keyword "fishing," means that members of the audience, compared to a random device, are 4 times more likely to go to the set of websites with the keyword "fishing."

At 208, a distance between an audience in the embedding space and the position of a search query embedding in the embedding space is determined. The distance can be based on the distance of the position of the search query embedding in the embedding space from a) the position of the embedding of the descriptive title of the audience, and/or b) the position of the embedding of the behavior history of the audience (e.g., audience keyword distance). The distance between the audience in the embedding space and the search query embedding in the embedding space represents a difference in the meaning of the search query and the meaning of the content of webpages accessed by audience members. Thus, in contrast to known methods, the actual behavior of audience members is used to determine a similarity between a search query and an audience. Furthermore, rather than a simple text- or category-based approach to classifying audience behavior, the embedding space represents the meaning of the content of webpages accessed by audience members.

The method 200 can include iterating, via a processor, to calculate a set of overall distances between the position of the search query in the embedding space and each audience from the set of audiences in the embedding space. The method 200 can include scoring each audience (e.g., based on the distance of that audience from the search query in the embedding space) and/or returning, at 208, a ranked list of audiences having the shortest overall distances from the search query embedding. The list, complete or in part can be presented to a graphical user interface (GUI) in form of a data stream, a table, and/or the like. Similarly stated, the list can presented to the device that entered and/or initiated the search query.

Figure 3:
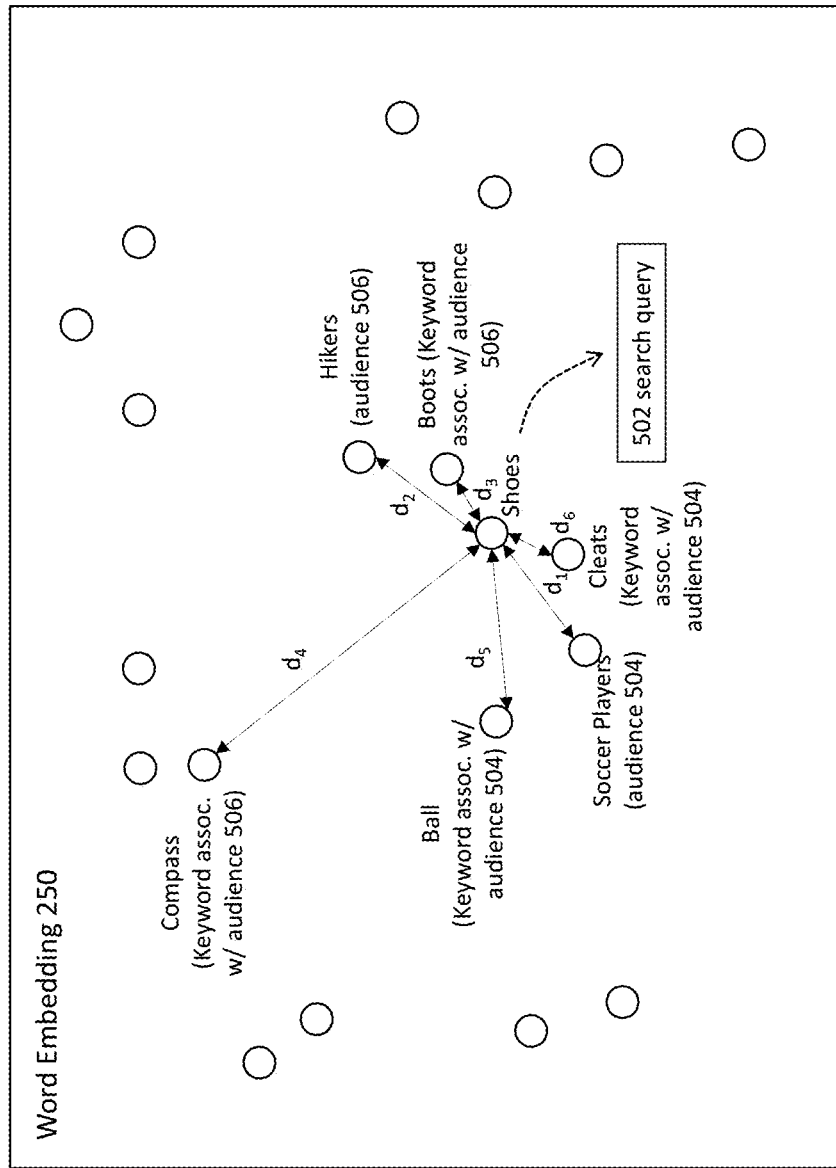
FIG. 3 is a simplified schematic illustration of a word embedding 250, according to an embodiment.

FIG. 3 is a simplified schematic illustration of a word embedding 250, according to an embodiment. As shown, a search query 252 for "shoes" has a position in the embedding space. A first audience 504 having a descriptive title "Soccer Players" has a position in the embedding space. Distance $d_1$ represents a semantic similarity between "Shoes" and "Soccer Players." Two keywords, "Ball" and "Cleats" are associated with the "Soccer Players" audience 504. The shorter distance $d_6$ between "Cleats" and "Shoes" than the distance $d_5$ between "Ball" and "Shoes" or distance $d_1$ represents that "Cleats" is more semantically similar to "Shoes" than "Ball" or "Soccer Players." Similarly, a second audience 506, "Hikers," and two keywords associated with the "Hikers" audience 506, "Boots" and "Compass" have positions in the embedding space and the distance between "Hikers," "Boots," and "Compass" and "Shoes" ($d_2$, $d_3$, and $d_4$, respectively) represents the semantic similarity between the search query and the descriptive title and each of the keywords.

The "Soccer Players" audience 504 and the "Hikers" audience 506 can be assigned a score based on the distances between the descriptive title and/or keywords associated with the audiences and the search query in the embedding space. For example, if a sum, mean, median, product, minimum or any other suitable combination or metric summarizing or representing $d_1$, $d_5$, and/or $d_6$ is lower than the combination or metric summarizing or representing $d_2$, $d_3$, and/or $d_4$, the "Soccer Players" audience 504 can be scored or ranked higher than the "Hikers" audience 506, representing that soccer players have a stronger interest in or similarity to shoes than hikers and therefore that soccer players represent a better audience for targeted content related to shoes.

Although FIG. 3 shows two keywords associated with each of two audiences, it should be understood that there may be any number of audiences and that each audience may be associated with any number of keywords. In some instances, only a subset of the descriptive title and/or keywords associated with an audience may be considered when determining a score or rank for an audience. For example, only the 2, 3, or any predefined number of keywords and/or descriptive titles associated with an audience that are closest to the search query in the embedding space. In addition or alternatively, keywords and/or descriptive titles that have an absolute distance from the search query in the embedding space that is greater than a predetermined distance may be discarded.

As shown in FIG. 3, a distance from the search query 502 to each keyword is determined. In other embodiments, however, a single representation of more than one keyword associated with the audience and/or the descriptive title of the audience can be determined and a distance in the embedding space from the search query to that location, which summarizes keyword(s) and/or descriptors can be determined.

Figure 4:
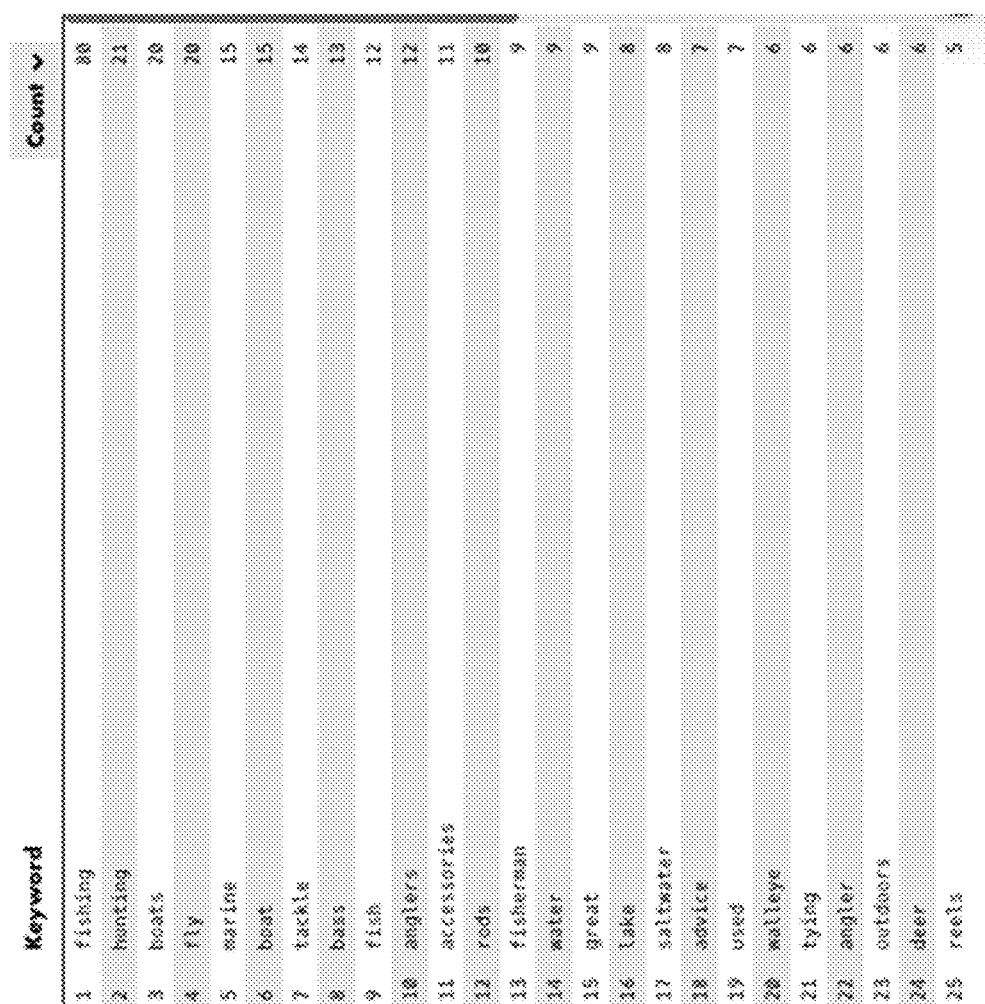
FIG. 4 is a table showing an example output from a keyword generator program, according to an embodiment.

FIG. 4 is a table showing an example output from a keyword generator program, such as the keyword generator 106 presented in FIG. 1, in response to a fishing enthusiast audience, according to an embodiment. Generating a table of audience keywords according to methods described herein can serve to identify audiences based not only their names or their descriptive title, but also their browsing history, patterns of user interaction with websites, user behavior, and/or the like. Identifying the keywords for an audience can involve counting the number of time a keyword appear in website history data and/or the metadata of audience members that are included within the audience and reporting a count value for each keyword. Such a count value can be used to weight keywords when determining a distance between a keyword embedding and a search query embedding. A position of each keyword in the embedding space can be determined. The position of the audience keywords can be a (optionally weighted) average (or other measure) of each of the audience keywords.

Figure 5:
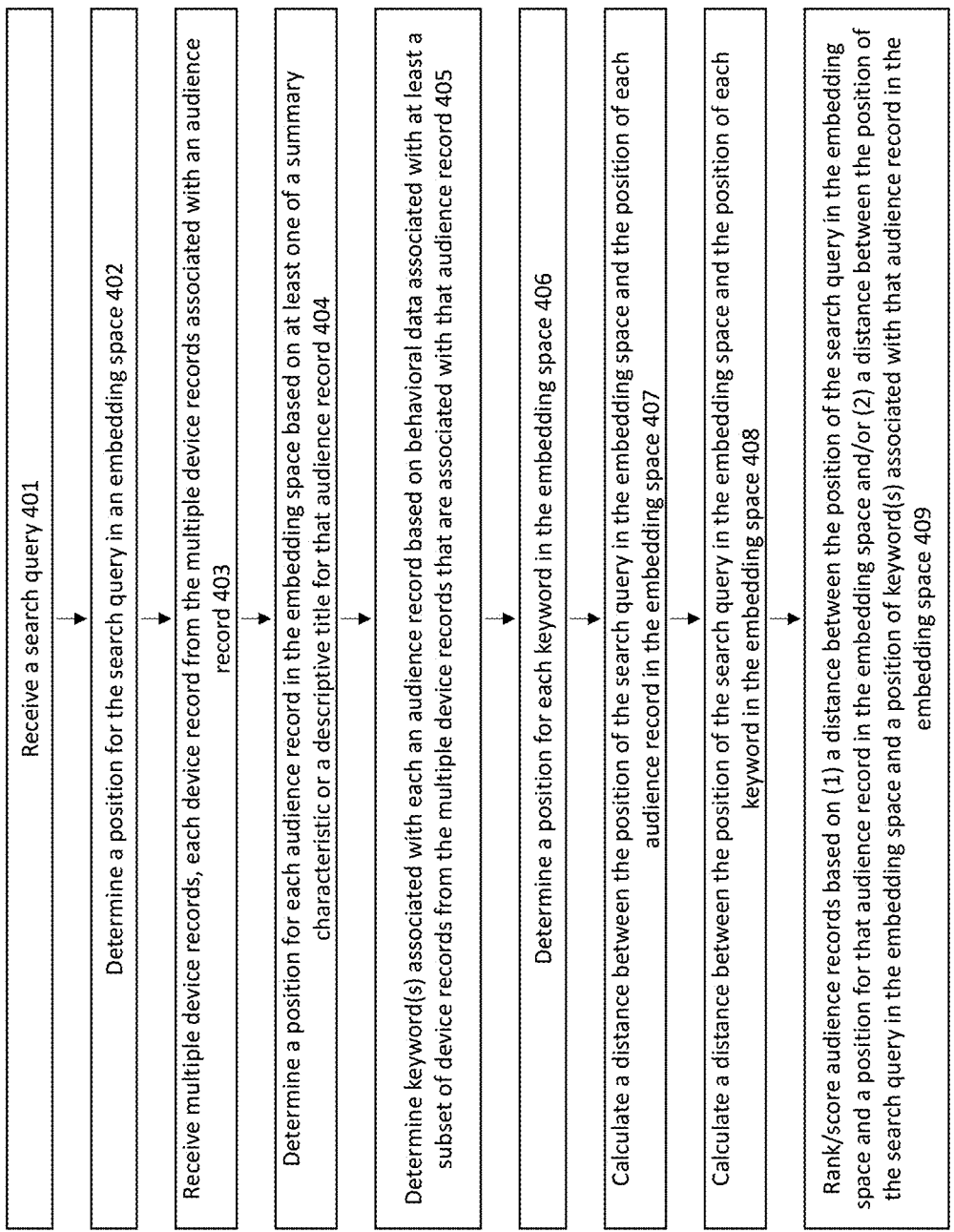
FIG. 5 is a method of exploring audiences based on a search query, according to an embodiment.

FIG. 5 is a method 400 of exploring audiences based on a search query, according to an embodiment. The method 400 can be performed, for example, by an audience explorer device (such as the audience explorer device 101 as shown and described with respect to FIG. 1). The method 400 can include receiving, at 401, a search query. The method 400 can include determining, at 402, a position for the search query in an embedding space. The method 400 can include receiving, at 403, device records. In some instances, individual device records (e.g., a device record for individual users/audience devices) can be received at 403 and associated with an audience. In other instances, aggregated device records can be received, for example, with an indication of a pre-defined audience. In some instances, each device record includes at least one of browsing history records or cookie records, for one or more audience devices (such as the set of audience devices 130 as shown and described with respect to FIG. 1). The method 400 can include determining, at 404, a position of each audience record from the multiple audience records in the embedding space based on at least one of a summary characteristic or a descriptive title for that audience record.

The method 400 can include determining, at 405, one or more keywords. Each keyword can be associated with an audience record. The keyword can be determined based on behavioral data associated with at least a subset of device records that are associated with that audience record. The behavioral data associated with the multiple device records can be aggregated behavioral data and/or summary behavioral data. Determining keywords based on the aggregated behavioral data and/or summary behavioral data can help in reducing/eliminating processing resources used to analyze behavioral data for individual members associated with each audience record from the multiple audience records and/or can preserve user privacy.

In some instances, each keyword can be associated with content of a website or websites disproportionately visited by the subset of device records that are associated with an audience record. In some instances, each keyword is obtained by identifying a word statistically overrepresented on a website(s) disproportionately visited as indicated by the subset of device records that are associated with an audience record that is from the multiple audience records and that is associated with that keyword.

The method 400 can include determining, at 406, a position for each keyword in the embedding space. In some instances, each of the position of the search query, the position of each audience record, and/or the position of each keyword can be represented by a vector and/or set of coordinates that define a location in the embedding space.

The method 400 can include calculating, at 407, a distance between the position of the search query in the embedding space and the position of each audience record from the multiple audience records in the embedding space. The method 400 can include calculating, at 408, a distance between the position of the search query in the embedding space and the position of each keyword from the multiple keywords in the embedding space. The method 400 can further include ranking, at 409, each audience record from the multiple audience records based on (1) a distance between the position of the search query in the embedding space and a position for that audience record in the embedding space and/or (2) a distance between the position of the search query in the embedding space and a position of one or more keywords associated with that audience record in the embedding space. The distance between the position of the search query in the embedding space and the position of each audience record and/or keyword in the embedding space can be calculated using at least one of a Euclidean distance, a Cosine distance, a word mover's distance (WMD), and/or the like.

In some embodiments, the method 400 can optionally include generating a search query embedding, an audience embedding, and/or a keyword embedding from the search query, each audience record, and/or each keyword, respectively. The search query embedding, the audience embedding, or the keyword embedding can be generated using a vector representation library.

In some embodiments, the method 400 can optionally include generating the embedding space based on an English (or other) language corpus, such as fiction and/or non-fiction books, reference works, such as Wikipedia, and/or any other suitable database. An embedding space generator (such as the embedding space generator 105 as shown and described with respect to FIG. 1) can be configured to generate the embedding space. In some instances, the embedding space generator can receive an initial embedding space and generate the embedding space based on the initial embedding space and an additional language corpus.

While various embodiments have been described above, it should be understood that they have been presented by way of example only, and not limitation. For example, although embodiments described herein generally discuss receiving a descriptive title or other summary characteristic of an audience, in other embodiments a coded or serialized audience identifier can be received that does not, by itself, provide any information about the audience other than an identifier. In such embodiments, systems and methods described herein (e.g., the audience explorer device 101) can be operable to define a descriptive title for the audience, for example, based on behavioral data that is also received for that audience.

Furthermore, although various embodiments have been described as having particular features and/or combinations of components, other embodiments are possible having a combination of any features and/or components from any of embodiments where appropriate as well as additional features and/or components. Some embodiments described herein relate to methods. It should be understood that such methods may be computer implemented methods (e.g., instructions stored in memory and executed on processors). Where methods described above indicate certain events occurring in certain order, the ordering of certain events may be modified. Additionally, certain of the events may be performed repeatedly, concurrently in a parallel process when possible, as well as performed sequentially as described above. Furthermore, certain embodiments may omit one or more described events.

Some embodiments described herein relate to computer-readable medium. A computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as ASICs, PLDs, ROM and RAM devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

What is claimed is:

1. A method, comprising:
   receiving a search query;
   determining a position for the search query in an embedding space;
   receiving a plurality of device records, each device record from the plurality of device records associated with an audience record from a plurality of audience records;
   identifying a plurality of keywords, each keyword from the plurality of keywords identified based on behavioral data associated with at least one audience from a plurality of audiences, each audience from the plurality of audiences associated with a subset of device records from a plurality of device records;
   determining a position in the embedding space for each keyword from the plurality of keywords;
   calculating a distance between the position of the search query in the embedding space and the position of each keyword from the plurality of keywords in the embedding space; and
   ranking the plurality of audiences based on a distance between the position of the search query in the embedding space and the position in the embedding space for the keyword associated with that audience record and from the plurality of keywords.

2. The method of claim 1, wherein the plurality of device records includes aggregate behavioral data for each audience from the plurality of audiences.

3. The method of claim 1, wherein the plurality of device records includes aggregate behavioral data such that behavioral data associated with individual device records from the plurality of device records is not available for analysis.

4. The method of claim 1, wherein the behavioral data includes internet browsing history.

5. The method of claim 1, wherein each keyword from the plurality of keywords is based on content appearing on websites visited by the plurality of audiences.

6. The method of claim 1, further comprising generating the embedding space based on a natural language corpus.

7. The method of claim 1, wherein the position of the search query and the position of the keyword associated with the audience record are each represented by a set of coordinates that defines a location in the embedding space.

8. The method of claim 1, wherein each keyword from the plurality of keywords is associated with content of a website disproportionately visited as indicated by an audience from the plurality of audiences.

9. The method of claim 1, wherein each keyword from the plurality of keywords is obtained by identifying a word statistically overrepresented on a website disproportionately visited by an audience from the plurality of audiences.

10. The method of claim 1, further comprising:
identifying at least one of a summary characteristic or a descriptive title for each audience from the plurality of audiences based on the plurality of device records;
determining a position for each summary characteristic or descriptive title in the embedding space;
calculating a distance between the position of the search query in the embedding space and the position of each summary characteristic or descriptive title in the embedding space,
the ranking including ranking the plurality of audiences based on the distance between the position of the search query in the embedding space and the position of each summary characteristic or descriptive title in the embedding space.

11. A non-transitory processor-readable medium storing code representing instructions to be executed by a processor, the code comprising code to cause the processor to:
receive, from a compute device, a search query;
generate a search query embedding based on the search query;
generate a plurality of keyword embeddings, each keyword embedding from the plurality of keyword embeddings associated with an audience from the plurality of audiences and based on behavioral data associated with that audience;
determine a position in an embedding space for the search query embedding and each keyword embedding from the plurality of keyword embeddings;
calculate a distance in the embedding space between the search query embedding and each keyword embedding from the plurality of keyword embeddings;
determine, for each audience from the plurality of audiences, a score based on the distance between the search query embedding and the keyword embedding from the plurality of keyword embeddings associated with that audience; and
send, to the compute device, an indication of a subset of audiences from the plurality of audiences, the score for each audience from the subset of audiences being above a predetermined threshold.

12. The non-transitory processor-readable medium of claim 11, the code further comprising code to cause the processor to rank the plurality of audiences based on the score for each audience from the plurality of audiences.

13. The non-transitory processor-readable medium of claim 11, the code further comprising code to cause the processor to select content for delivery to a website associated with the search query based on behavioral data associated with the subset of audiences.

14. The non-transitory processor-readable medium of claim 11, wherein the behavioral data associated with each audience from the plurality of audiences includes is aggregate behavioral data.

15. The non-transitory processor-readable medium of claim 11, the code further comprising code to cause the processor to:
identify at least one of a summary characteristic or a descriptive title for each audience from the plurality of audiences based on the behavioral data associated with that audience; and
determine a position in the embedding space for each summary characteristic or descriptive title in the embedding space,
the code to determine the score for each audience from the plurality of audiences including code to determine, for each audience from the plurality of audiences a distance between the position of the search query in the embedding space and the position of each summary characteristic or descriptive title in the embedding space.

16. The non-transitory processor-readable medium of claim 11, the code further comprising code to cause the processor to generate the embedding space based on a natural language corpus.

17. A non-transitory processor-readable medium storing code representing instructions to be executed by a processor, the code comprising code to cause the processor to:
determine a position for a search query in an embedding space;
identify, for each audience from a plurality of audiences, a keyword from a plurality of keywords based on aggregated behavioral data associated with an audience record for that audience;
determine a position for each keyword from the plurality of keywords in the embedding space;
calculate a similarity between the search query and each audience from the plurality of audiences based on a distance, in the embedding space, between the position of the search query and a keyword from the plurality of keywords associated with that audience; and
send, to the compute device, a ranked list of at least a subset of audiences from the plurality of audiences based on the similarity between the search query and each audience from the subset of audiences.

18. The non-transitory process-readable medium of claim 17, the code further comprising code to cause the processor to generate the embedding space based on a natural language corpus.

19. The non-transitory processor-readable medium of claim 17, wherein the aggregated behavioral data obscures behavioral data for individual audience members from each audience from the plurality of audiences.

20. The non-transitory process-readable medium of claim 17, the code further comprising code to cause the processor to:
generate, for each audience from the plurality of audiences, a descriptive embedding based on a descriptor associated with the audience record for that audience;
determine a position for each descriptive embedding from a plurality of descriptive embeddings in the embedding space; and the similarity between the search query and each audience from the plurality of audiences based on a distance between the position of the search query in the embedding space and the position of the descriptive embedding associated with that audience.

* * * * *